United States Patent
Hamaguchi

(10) Patent No.: US 8,200,417 B2
(45) Date of Patent: Jun. 12, 2012

(54) APPARATUS AND PROGRAM FOR ROUTE SEARCH

(75) Inventor: Kenichi Hamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 812 days.

(21) Appl. No.: 12/230,963

(22) Filed: Sep. 9, 2008

(65) Prior Publication Data

US 2009/0082956 A1 Mar. 26, 2009

(30) Foreign Application Priority Data

Sep. 26, 2007 (JP) ................................. 2007-249193

(51) Int. Cl.
*G01C 21/32* (2006.01)
*G06F 19/00* (2011.01)

(52) U.S. Cl. ........................................................ 701/207

(58) Field of Classification Search .................... 701/45, 701/201, 207, 213, 208; 706/12, 20
See application file for complete search history.

(56) References Cited

U.S. PATENT DOCUMENTS

| | | | | |
|---|---|---|---|---|
| 4,509,040 A * | 4/1985 | Seko et al. | ..................... | 340/576 |
| 4,611,199 A * | 9/1986 | Seko et al. | ..................... | 340/576 |
| 5,813,993 A * | 9/1998 | Kaplan et al. | ................. | 600/544 |
| 6,865,481 B2 | 3/2005 | Kawazoe et al. | | |
| 6,879,969 B2 * | 4/2005 | Engstrom et al. | ............... | 706/20 |
| 7,415,126 B2 * | 8/2008 | Breed et al. | .................. | 382/100 |
| 2004/0193347 A1 * | 9/2004 | Harumoto et al. | ............. | 701/45 |
| 2007/0040705 A1 | 2/2007 | Yoshioka et al. | | |
| 2009/0058660 A1 * | 3/2009 | Torch | ........................ | 340/573.1 |

FOREIGN PATENT DOCUMENTS

| | | |
|---|---|---|
| JP | A-10-332408 | 12/1998 |
| JP | A-2003-205761 | 7/2003 |
| JP | A-2005-190082 | 7/2005 |
| JP | A-2005-267137 | 9/2005 |
| JP | A-2006-027534 | 2/2006 |
| JP | A-2006-277165 | 10/2006 |
| JP | A-2007-065997 | 3/2007 |
| JP | A-2007-108926 | 4/2007 |
| JP | A-2008-023086 | 2/2008 |

OTHER PUBLICATIONS

Office Action mailed Sep. 15, 2009 from the Japan Patent Office for corresponding patent application No. 2007-249193 (English translation enclosed).

* cited by examiner

*Primary Examiner* — Vivek Koppikar
*Assistant Examiner* — Edward Winston, III
(74) *Attorney, Agent, or Firm* — Posz Law Group, PLC

(57) ABSTRACT

A route search apparatus stores a section of a route to a database when drowsiness of a driver is detected by a drowsiness detector in the section of the route. The route search apparatus refers to the database and determines whether route candidates include a drowsiness-detected route section when the apparatus searches for a route extending from a departure place to a destination. When the drowsiness-detected route section is included in the route candidates, an evaluation value of the drowsiness-detected route section is raised before re-searching the route extending from the departure place to the destination.

7 Claims, 6 Drawing Sheets

FIG. 3

| SECTION | TIME | START PL | # OF USE | # OF DOZE | FREQ |
|---|---|---|---|---|---|
| ROAD A(SECTION x) | 13:00-14:00 | RESTAURANT G | 10 | 6 | 0.60 |
| ROAD A(SECTION x) | 18:00-19:00 | RESTAURANT G | 5 | 1 | 0.20 |
| ROAD B(SECTION y) | 14:00-15:00 | HOME | 30 | 6 | 0.20 |
| | | | | | |

FIG. 4

| SECTION | TIME | START PL | # OF USE | # OF DOZE | FREQ |
|---|---|---|---|---|---|
| ROAD A(SECTION x) | 13:00-14:00 | RESTAURANT G | 11 | 7 | 0.63 |
| ROAD A(SECTION x) | 18:00-19:00 | RESTAURANT G | 5 | 1 | 0.20 |
| ROAD B(SECTION y) | 14:00-15:00 | HOME | 30 | 6 | 0.20 |
| | | | | | |

FIG. 5

| SECTION | TIME | START PL | # OF USE | # OF DOZE | FREQ |
|---|---|---|---|---|---|
| ROAD A(SECTION x) | 13:00-14:00 | RESTAURANT G | 10 | 3 | 0.30 |
| ROAD A(SECTION x) | 18:00-19:00 | RESTAURANT G | 5 | 1 | 0.20 |
| ROAD B(SECTION y) | 14:00-15:00 | HOME | 30 | 6 | 0.20 |
| ROAD C(SECTION z) | 14:00-15:00 | HOME | 1 | 1 | 1.00 |

| SECTION | TIME | START PL | # OF USE | # OF DOZE | FREQ |
|---|---|---|---|---|---|
| ROAD A (SECTION x) | 13:00-14:00 | RESTAURANT G | 10 | 6 | 0.60 |
| ROAD A (SECTION x) | 18:00-19:00 | RESTAURANT G | 5 | 1 | 0.20 |
| ROAD B (SECTION y) | 14:00-15:00 | HOME | 30 | 6 | 0.20 |
| ROAD D (SECTION w) | 13:00-14:00 | RESTAURANT G | 5 | 2 | 0.40 |

| SECTION | TIME | START PL | # OF USE | # OF DOZE | FREQ |
|---|---|---|---|---|---|
| ROAD A (SECTION x) | 13:00-14:00 | RESTAURANT G | 10 | 6 | 0.60 |
| ROAD A (SECTION x) | 18:00-19:00 | RESTAURANT G | 5 | 1 | 0.20 |
| ROAD A (SECTION x') | 13:00-14:00 | RESTAURANT G | 30 | 6 | 0.20 |
| ROAD D (SECTION w) | 13:00-14:00 | RESTAURANT G | 5 | 2 | 0.40 |

APPARATUS AND PROGRAM FOR ROUTE SEARCH

CROSS REFERENCE TO RELATED APPLICATION

The present application is based on and claims the benefit of priority of Japanese Patent Application No. 2007-249193 filed on Sep. 26, 2007, the disclosure of which is incorporated herein by reference.

FIELD OF THE INVENTION

The present invention relates to a route search apparatus that searches for a route from a departure place to a destination.

BACKGROUND OF THE INVENTION

There have been conventionally proposed various apparatuses that detect dozing of a driver and issues a warning. (Refer to Japanese Patent Documents JP-A-2005-190082 and JP-A-2003-205761, for example.)

There are apparatuses that carry out control to stop a vehicle for the prevention of an accident due to neglect of a stop sign, drowsy driving, or the like when the vehicle approaches a preset stop point. (Refer to Japanese Patent Document JP-A-H10-332408, for example.)

There are apparatuses that provide a user with information in an interactive manner for getting rid of the user's boredom or drowsiness. (Refer to Japanese Patent Document JP-A-2003-329477 (U.S. Pat. No. 6,865,481), for example.)

However, the above apparatuses cause a problem. The apparatuses described in Japanese Patent Documents JP-A-2005-190082 and JP-A-2003-205761 issue a warning only when a driver dozes off. These apparatuses cannot search for such a route that a section where the driver's drowsiness was detected in the past is avoided. The apparatus described in Patent Document JP-A-H10-332408 and JP-A-2003-329477 cannot search for such a route that a section where the driver's drowsiness was detected in the past is avoided, either.

SUMMARY OF THE INVENTION

The invention has been made in consideration of the above problem. It is an object of the invention to make it possible to search for such a route that a section where drowsiness of a driver was detected in the past is avoided.

An aspect of the invention is presented as a route search apparatus equipped with a first route search unit. The first route search unit computes the evaluation value of each section and searches for a route by which the total evaluation value is minimized among route candidates from a departure place (i.e., a start point) to a destination. The route search apparatus includes: a drowsiness detecting unit for detecting the driver's drowsiness; a storage control unit that, when the driver's drowsiness is detected by the drowsiness detecting unit, stores the section where the driver's drowsiness was detected in a storage unit; and a first determination unit that refers to the storage unit and determines whether or not the section where the driver's drowsiness was detected is included in a route candidate from the departure place to the destination. When the first determination unit determines that the section where the driver's drowsiness was detected is included in a route candidate from the departure place to the destination, the first route search unit carries out the following processing: the first route search unit increases the evaluation value of the section where the driver's drowsiness was detected and searches for a route from the departure place to the destination again.

With the above configuration, the following processing is carried out when it is determined that a section where the driver's drowsiness was detected is included in a route candidate from a departure place to a destination: the evaluation value of the section where the driver's drowsiness was detected is increased and a route from the departure place to the destination is searched for again. Therefore, such a route that a section where the driver's drowsiness was detected in the past is avoided can be searched for.

Another aspect of the invention is presented as a route search apparatus equipped with a second route search unit that computes the evaluation value of each section and searches for a route by which the total evaluation value is minimized among route candidates from a departure place to a destination. The route search apparatus includes: a drowsiness detecting unit for detecting the driver's drowsiness; a storage control unit that, when the driver's drowsiness is detected by the drowsiness detecting unit, stores the section where the driver's drowsiness was detected and further the frequency of the driver's drowsiness being detected in the section in a storage unit; and a first determination unit that refers to the storage unit and determines whether or not the section where the driver's drowsiness was detected is included in a route candidate from the departure place to the destination. When the first determination unit determines that the section where the driver's drowsiness was detected is included in a route candidate from the departure place to the destination, the second route search unit carries out the following processing: the second route search unit extracts the frequency of the driver's drowsiness being detected in each section included in the route candidate; and the second route search unit searches for a route by which the total of the frequencies of the driver's drowsiness being detected in the individual sections included in the route candidate from the departure place to the destination is minimized.

With the above configuration, the following processing is carried out when it is determined that a section where the driver's drowsiness was detected is included in a route candidate from a departure place to a destination: the frequency of the driver's drowsiness being detected in each section included in the route candidate is extracted; and a route by which the total of the frequencies of the driver's drowsiness was detected in the individual sections included in the route candidates from the departure place to the destination is minimized is searched for. Therefore, such a route that a section where the driver's drowsiness was detected in the past is avoided can be searched for.

BRIEF DESCRIPTION OF THE DRAWINGS

Other objects, features and advantages of the present invention will become more apparent from the following detailed description made with reference to the accompanying drawings, in which:

FIG. 3 illustrates an example of a structure of drowsiness detection information in the first embodiment of the present invention;

FIG. 4 illustrates an example of drowsiness detection information in the first embodiment of the present invention;

FIG. 5 illustrates another example of a structure of drowsiness detection information in the first embodiment of the present invention;

DETAILED DESCRIPTION (First Embodiment)

Figure 1:
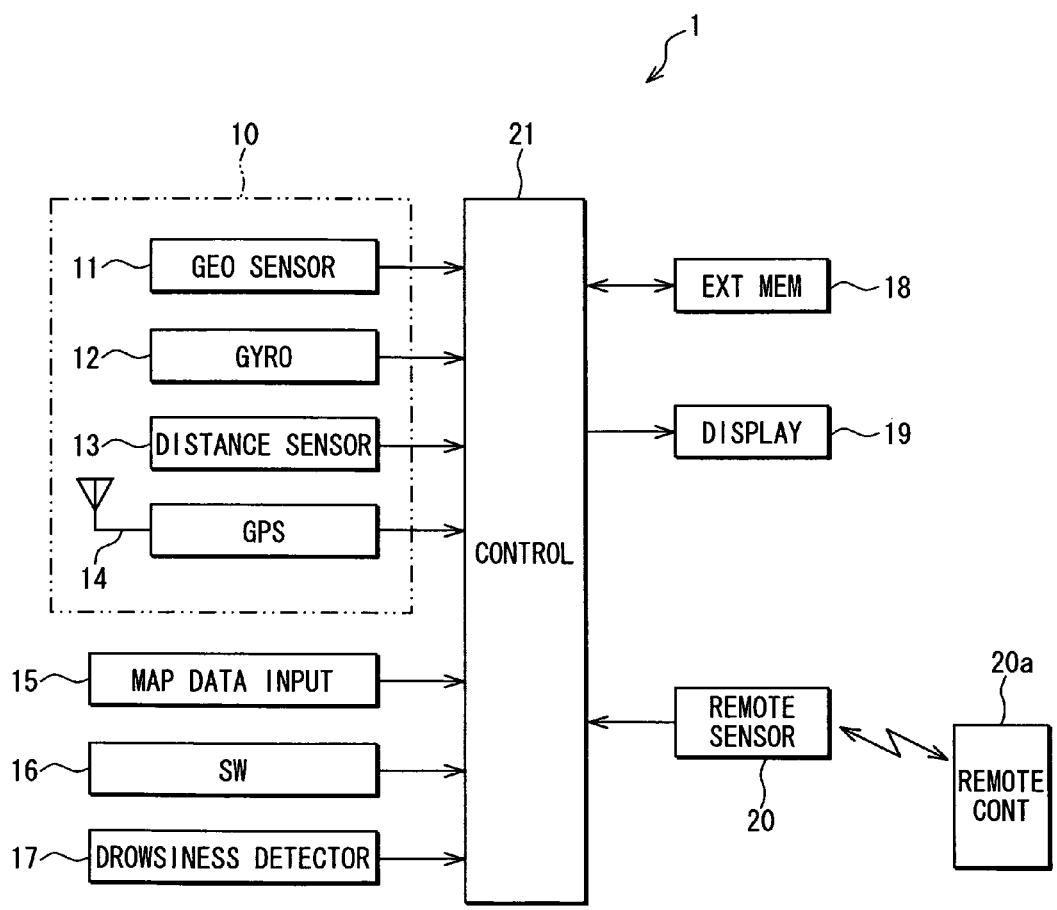
FIG. 1 illustrates a configuration of a route search apparatus in a first embodiment of the present invention.

FIG. 1 illustrates the configuration of a route search apparatus in a first embodiment of the present invention. The route search apparatus in the present embodiment is constructed as an automobile navigation system 1.

The automobile navigation system 1 includes a position detector 10, a map data input device 15, an operating switch group 16, a drowsiness detector 17, an external memory 18, a display device 19, a remote controller sensor 20, and a control device 21.

The position detector 10 includes a geomagnetic sensor 11, a gyroscope 12, a distance sensor 13, a GPS receiver 14, and the like which are all publicly known. The position detector outputs information for identifying the present position and orientation of the vehicle based on the properties of each of these sensors to the control device 21.

The map data input device 15 is constructed of a nonvolatile storage medium, such as a hard disk drive (HDD), holding map data and a device that reads and writes data from and to the storage medium.

The map data includes: road data indicating the length of each link, road category, the number of lanes, the position of a traffic signal, and the like; so-called map matching data for the enhancement of position detection accuracy; background data indicating the position, shape, and name of each of rivers, lakes, seas, railroads, facilities, and the like; facility data indicating the name, location, type, and the like of each of facilities in each area; and the like.

The operating switch group 16 is constructed of: a mechanical switch provided around the display surface of the display device 19 or in any other like area; a touch switch provided on the display surface of the display device 19; and the like. The operating switch group outputs a signal corresponding to a switch operation by the user to the control device 21.

The drowsiness detector 17 detects the driver's drowsiness and is constructed of equipment for detecting hard braking and abrupt steering of the vehicle and the numbers of times of the driver's blinking and yawning. Hard braking of the vehicle is detected using an acceleration sensor for detecting the acceleration of the vehicle, and abrupt steering of the vehicle is detected using a steering angle sensor for detecting the steering angle of the vehicle. The number of times of the driver's blinking and yawning are detected using an image recognition device that processes a camera image obtained by shooting the driver' face to recognize the movement of the driver' face.

When the drowsiness detector 17 in the present embodiment detects either hard braking of the vehicle or abrupt steering of the vehicle at all, the drowsiness detector outputs a detection signal indicating that the driver's drowsiness has been detected to the control device 21. When blinking of the driver is detected more times than a specified value of number of times of blinking per certain time period, the drowsiness detector 17 outputs a detection signal indicating that the driver's drowsiness has been detected to the control device 21. Or when blinking of the driver is detected more times than a specified value, the drowsiness detector 17 outputs the detection signal to the control device 21.

The external memory 18 is provided aside from a RAM or a ROM, to be described later, provided in the control device 21, and is constructed of a nonvolatile storage medium, such as a flash memory or the like.

The display device 19 has the display surface of liquid crystal or the like and displays an image on the display surface in correspondence with an image signal inputted from the control device 21.

The remote controller sensor 20 outputs to the control device 21 a signal received from a remote controller 20a for transmitting a radio signal by an infrared ray or the like according to an operation by the user.

The control device 21 is constructed of a computer including a CPU, RAM, ROM, I/O, and the like, and the CPU carries out various processing according to a program stored in the ROM. The processing carried out by the control device 21 includes: present position identification processing for identifying the present position or orientation of the vehicle based on information for identifying a present position or orientation of the vehicle, inputted from the position detector 10; map display processing for displaying a map of the area in proximity to the present position with a relevant vehicle mark superimposed thereon on the display surface of the display device 19; destination search processing for searching for a destination according to an operation by the user; route search processing for searching for a guided route from a departure place to a destination; route guidance processing for guiding the driver in driving in accordance with a guided route; and the like.

In the present embodiment, the automobile navigation system 1 carries out drowsiness detected section storage processing to store drowsiness detection information in a database when the driver's drowsiness is detected by the drowsiness detector 17. The drowsiness detection information includes the section where the driver's drowsiness was detected, the time period during which the driver's drowsiness was detected, a place of start (point of departure), frequency, and the like.

Figure 2:
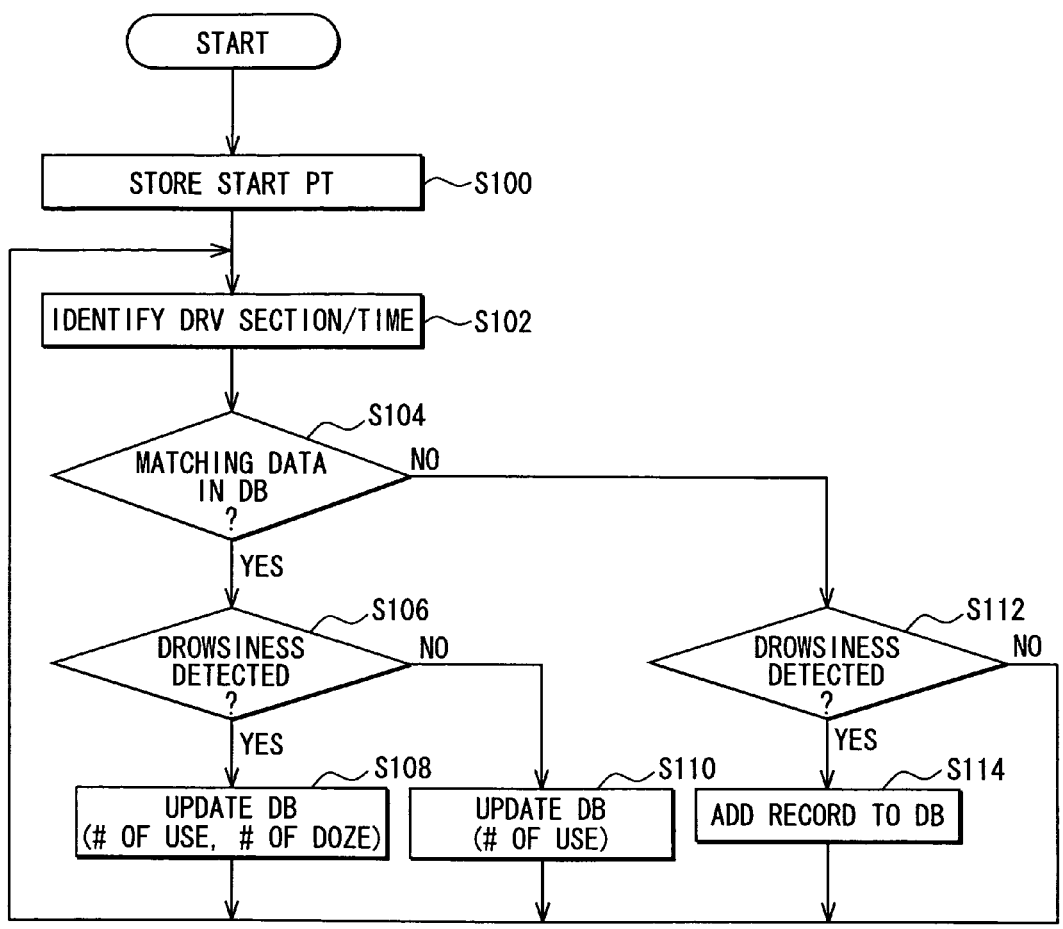
FIG. 2 illustrates a flowchart of drowsiness detected section storage processing.

Description will be given to the drowsiness detected section storage processing with reference to FIG. 2. When an ignition switch of the vehicle is turned on according to an operation by the driver, the automobile navigation system 1 becomes active. The control device 21 starts the drowsiness detected section storage processing together with the present position identification processing, the map display processing, and the like.

First, the control device 21 refers to map data to identify the place of start (point of departure) of the relevant vehicle and stores the place of start in the RAM (S100). Specifically, the control device stores the place of start in the RAM as facility information, such as a restaurant G and a home. The place of start may be stored as longitude and latitude information.

Subsequently, the driving section and period of time are identified (S102). Specifically, the driving section where the relevant vehicle is positioned is identified as a section x of a national road A and the period of time based on the present time is identified as a period of time from 13:00 to 14:00. In the present embodiment, the periods of time are classified on an hour-by-hour basis with reference to 0 minute of each hour. Instead, the periods of time may be classified into, for example, time slots of dawn, morning, daytime, dust, evening, and night.

Subsequently, it is determined whether or not there is matching data in the database (S104). FIG. 3 illustrates an example of the structure of drowsiness detection information in the present embodiment. When the driver's drowsiness is detected by the drowsiness detector 17, the following information is stored in the database: the section where the driver's drowsiness was detected; the period of time during which the driver's drowsiness was detected; a driving start point (place of start), the number of times when the section was used in the past (number of times of use), the number of times when the driver's drowsiness was detected (number of times of dozing), and the frequency obtained by dividing the number of times of dozing by the number of times of use. When the section where the driver's drowsiness was detected, the period of time during which the driver's drowsiness was detected, and the driving start point (place of start) are identical, the following measure is taken: the number of times of use, number of times of dozing, and frequency are stored in the database as a grouped entry under identical conditions.

At Step S104, it is determined whether or not in the database there is any matching data entry in terms of the place of start stored in the RAM at Step S100 and the driving section and period of time identified at Step S102. That is, it is determined whether or not there is an entry under identical conditions in the database.

When there is an entry under identical conditions in the database, it is subsequently detected whether or not the driver's drowsiness has been detected by the drowsiness detector 17 (S106).

Therefore, when there is a group under identical conditions in the database and the driver's drowsiness has been detected, an affirmative determination at Steps S104 and S106 and Then, the database is updated (S108). Specifically, the number of times of use and number of times of dozing in the entry under identical conditions are incremented. Since the number of times of use and the number of times of dozing are updated, the frequency is also updated.

For example, when the driver's drowsiness is detected under conditions having matching section, period of time, and place of start indicated by the data on the uppermost row in FIG. 3, the following processing is carried out: the number of times of use is updated to 11, the number of times of dozing is updated to 7, and the frequency is updated to 0.63 as indicated by the data on the uppermost row in FIG. 4.

When there is a group under identical conditions in the database but the driver's drowsiness has not been detected, an affirmative determination is made at Step S106 and a negative determination is made at Step S108. Then, the database is updated (S110). Specifically, only the number of times of use in the entry under identical conditions is incremented. Since the number of times of use is updated, the frequency is also updated.

When there is not an entry under identical conditions in the database, a negative determination is made at Step S104. Subsequently, it is determined whether or not the driver's drowsiness has been detected by the drowsiness detector 17 (S112).

Therefore, when there is not an entry under identical conditions in the database and the driver's drowsiness has been detected, a negative determination is made at Step S104 and an affirmative determination is made at Step S112. Then, the new data record is added to the database (S114). Specifically, the place of start stored in the RAM at Step S100, the driving section and period of time identified at Step S102 are added to the database as a new entry.

For example, such data as on the lowest row in FIG. 5 is added. That is, the data indicating the following is newly added: the section is a national road C (a section z); the period of time is 14:00 to 15:00; the place of start is home; the number of times of use is 1; the number of times of dozing is 1; and the frequency is 1.00.

When there is not matched data in the database and the driver's drowsiness has not been detected, a negative determination is made both at Step S104 and at Step S112. The database is not updated and the flow returns to Step S102.

When the driver's drowsiness is detected, as mentioned above, the section where the driver's drowsiness was detected, the period of time during which the driver's drowsiness was detected, and the place of start are organized into a grouped entry. The numbers of times of use, numbers of times of dozing, and the frequencies of dozing are stored in the database on a group-by-group basis.

The automobile navigation system 1 in the present embodiment refers to information stored in the database and carries out route search processing to search for such a route that a section where the driver's drowsiness was detected is avoided.

Figure 6:
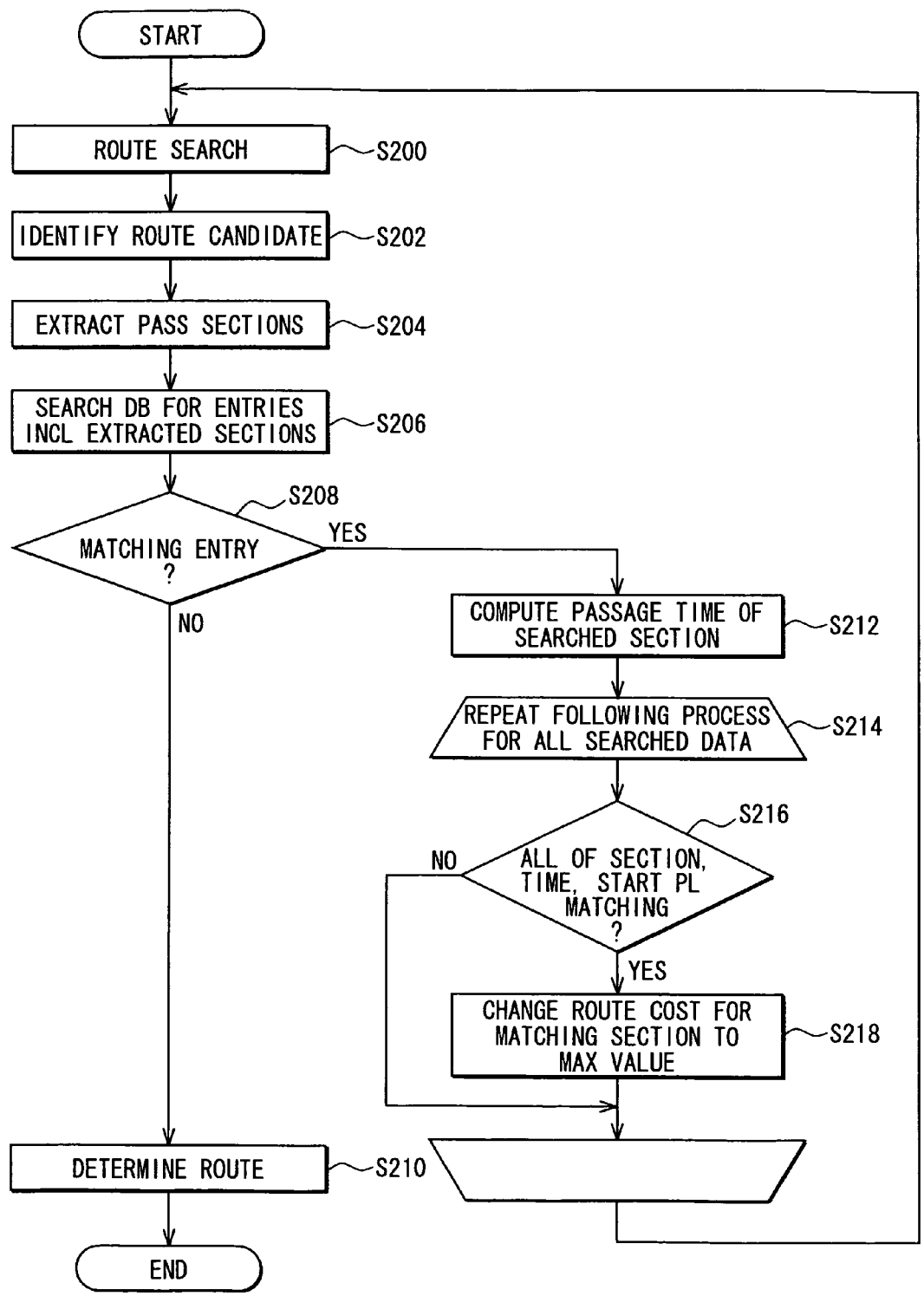
FIG. 6 illustrates a flowchart of route search processing in the first embodiment of the present invention.

Description will be given to the route search processing with reference to FIG. 6. When a destination is determined according to an operation by a user, and then route search is instructed by an operation by the user, the control device 21 carries out the processing illustrated in FIG. 6.

First, route search is carried out (S200). Specifically, the evaluation value of each section, for example, the route cost of each link is computed. Then, a route by which the total evaluation value is minimized is searched for among route candidates from the departure place to the destination.

Then, a route candidate is specified (S202). In this case, the route retrieved at Step S200 is specified as a route candidate.

Subsequently, sections of passage are extracted from the route candidate (S204). Specifically, all the sections of passage, for example, all the links included in the route candidate are extracted.

Then, the database is searched for any entry in which the same section as any of the extracted sections of passage is included (S206). That is, the database is referred to, and it is determined whether or not a section where the driver's drowsiness was detected is included in the route candidate from the departure place to the destination.

Thereafter, it is determined whether or not there is a relevant entry in the database (S208). Specifically, it is determined whether or not there is a relevant entry in the database based on the following: whether or not an entry in which the same section as any of the extracted sections of passage is included has been found in the database.

When an entry in which the same section as any of the extracted sections of passage is not found in the database, a negative determination is made at Step S208. Then, the route candidate is determined as the guided route (S210) and the series of processing is terminated.

When an entry in which the same section as any of the extracted sections of passage is found in the database, an affirmative determination is made at Step S208. Then, the period of time during which the vehicle passes through the section corresponding to the retrieved entry is computed (S212). Specifically, the following processing is carried out: first, the map data is referred to and the distance from the present position by which the vehicle will run before arrival at the section corresponding to the retrieved group; the distance is divided by a predetermined standard vehicle speed to compute a time it takes to arrive at the above section; and the time is added to the present time to determine a period of time during which the vehicle passes the above section.

The processing of Steps S216 and S218 is repeated on all the pieces of retrieved data (S214).

At Step S216, it is determined whether or not the section, period of time, and point of start (i.e., a start place in FIG. 6) are all matching. That is, it is determined whether or not there is any matching entry with respect to all of the following items in the database: a section of passage extracted from the route candidate, the period of time computed at Step S212, and the point of start.

When there is a matching entry with respect to all of the section, period of time, and point of start in the database, an affirmative determination is made at Step S216. Then, the evaluation value, for example, the route cost of the matched section is changed to the maximum value (S218). The evaluation value changed here is handled as data valid only for the route search processing.

When there is not a matching entry with respect to all of the section, period of time, and point of start in the database, the evaluation value is not changed.

As mentioned above, the processing of Steps S216 and S218 is repeated on all the entries of retrieved data. When the processing of Steps S216 and S218 is completed on all the entries of retrieved data, the flow returns to Step S210 and route search is carried out again.

When there is a section where the same conditions as the situation (section, period of time, point of start) in which the driver's drowsiness was detected in the past are met, the following measure is taken: the evaluation value of the section is changed to the maximum value by the above-mentioned processing of Step S218. Therefore, a new route candidate is searched for so that the section is avoided. Hereafter, the processing of Step S204 and the following steps is carried out with respect to the new route candidate.

When an entry including the same section as any of the extracted sections of passage is retrieved from the database again at Step S210, an affirmative determination is made at Step S210. The processing of Step S212 and the following steps is carried out and a new route candidate is searched for again at Step S200.

When with respect to a new route candidate, an entry including the same section as any of the extracted sections of passage is not found in the database at Step S208, a negative determination is made at Step S208. The new route candidate is determined as the guided route (S210). Specifically, the new route candidate is displayed as the guided route on the map. When a route by which a section where dozing was detected is avoided is displayed, a message indicating that the route avoids the section where dozing was detected is also displayed. When a route including a section where dozing was detected is displayed, a message (not shown) indicating that a section where dozing was detected is included is also displayed.

After a guided route is determined as mentioned above, route guidance processing is started to guide the driver in driving in accordance with the guided route.

With the above-mentioned configuration, the evaluation value of a section where the driver's drowsiness was detected is increased before a route from a departure place to a destination is searched for again. Therefore, such a route that a section where the driver's drowsiness was detected in the past is avoided can be retrieved.

When a retrieved guided route includes a section where the driver's drowsiness was detected, information indicating that the retrieved route includes a section where the driver's drowsiness was detected is displayed. When route search is completed, therefore, it is possible to recognize that the retrieved route includes a section where the driver's drowsiness was detected. Thus, it is possible to be careful not to doze during the driving.

(Second Embodiment)

The configuration of a route search apparatus in a second embodiment of the invention is the same as the configuration of the first embodiment illustrated in FIG. 1. In the description of the first embodiment, a case where the following measure is taken in route search processing has been taken as an example: when a route candidate includes a section where the driver's drowsiness was detected, the evaluation value of the section where the driver's drowsiness was detected is changed to the maximum value and route search is carried out again. In the present embodiment, meanwhile, the following measure is taken when a route candidate includes a section where the driver's drowsiness was detected: such a route that the total of the frequency of each section with which the driver's drowsiness was detected is minimized is searched for. Hereafter, the same elements as in the above embodiment will be marked with the same reference numerals and the description of these elements will be omitted. Description will be given with a focus on a difference of the present embodiment from the previous one.

Figure 7:
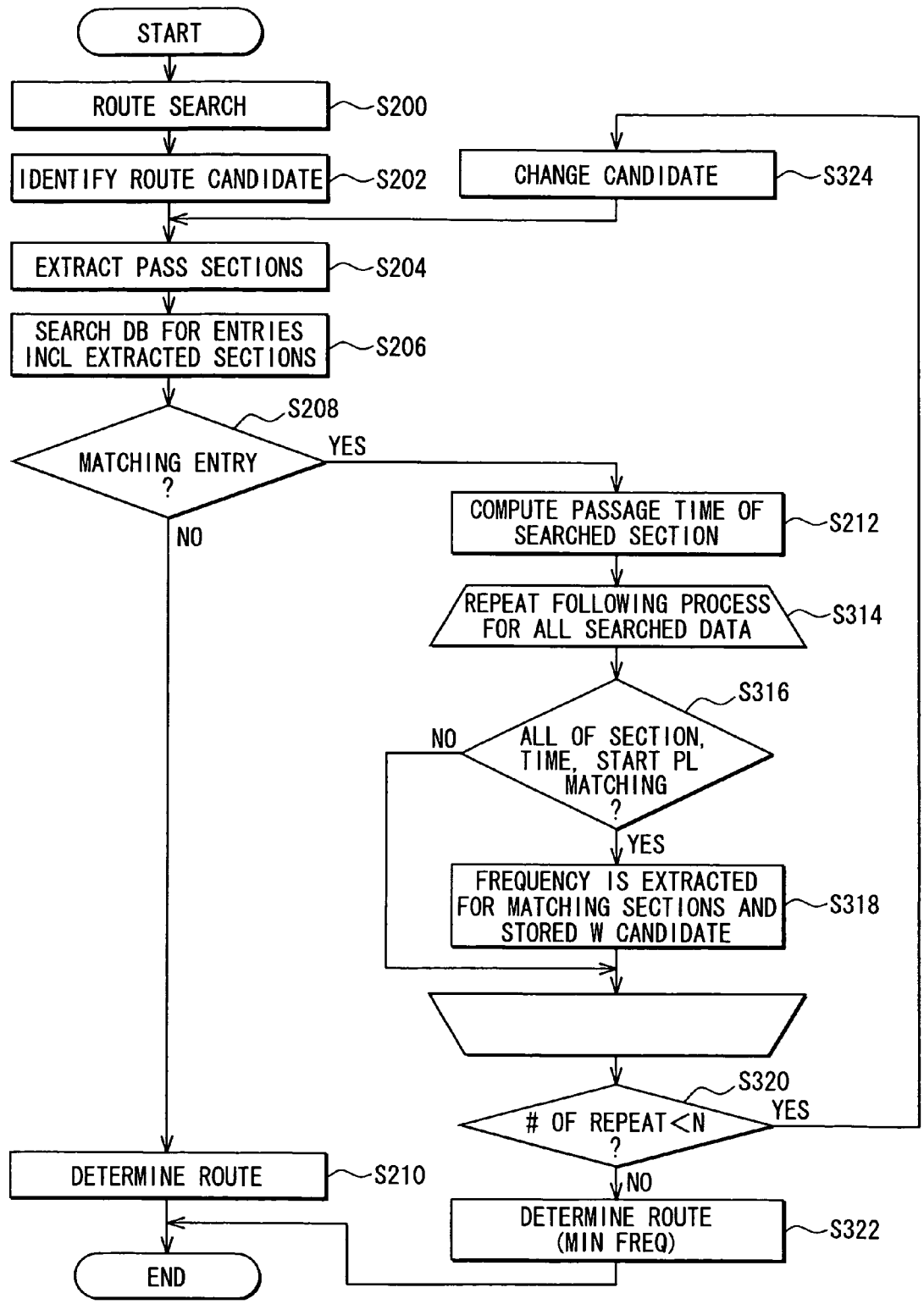
FIG. 7 is a flowchart of route search processing in a second embodiment of the present invention.

FIG. 7 is a flowchart of route search processing in the present embodiment. Steps S200 to S212 in FIG. 7 are the same as Steps S200 to S212 in FIG. 6. At Step S212, a period of time during which the vehicle passes through a section indicated by a retrieved entry is computed. Subsequently, the processing of Steps S316 and S318 is repeated on all the pieces of retrieved data (S312).

At Step S316, it is determined whether or not all of the section, period of time, and point of start are matching. That is, it is determined whether or not there is a matching entry with respect to all of the following items in the database: a section of passage extracted from the route candidate, the period of time computed at Step S212, and the point of start.

When there is a matching entry with respect to all of the section, period of time, and point of start in the database, an affirmative determination is made at Step S316. Subsequently, the frequency of the matching section is extracted and stored in the RAM in correlation with the route candidate (S318). The frequency of a matching section can be extracted from the database.

When there is not a matching entry with respect to all of the section, period of time, and point of start in the database, the processing of extracting frequency and storing it in the RAM in correlation with the route candidate is not carried out.

When the processing of Steps S316 and S318 is completed on all the pieces of retrieved data, it is determined whether or not the number of times of repetition is smaller than a reference number N of times (S320). When the number of times of repetition is smaller than the reference number N of time, the route candidate is changed to another route candidate (S324) and the flow returns to Step S204. Then, the above processing is repeated on the route candidate. As mentioned above, the route candidate is changed and the above-mentioned processing is repeatedly carried out. Therefore, an upper limit is set for the number of times of repetition at Step S320.

When the number of times of repetition becomes equal to the reference number N of times, a negative determination is made at Step S320, and then, a route is determined (S322). Specifically, the following processing is carried out: the frequencies of the route candidates stored in the RAM are compared with one another, and the route candidate by which the frequency is minimized is determined as the guided route; and the guided route is displayed over the map. When the guided route includes a section where the driver's dozing was detected, a message indicating that a section where dozing was detected is included is also displayed.

Figures 8, 9, 10:
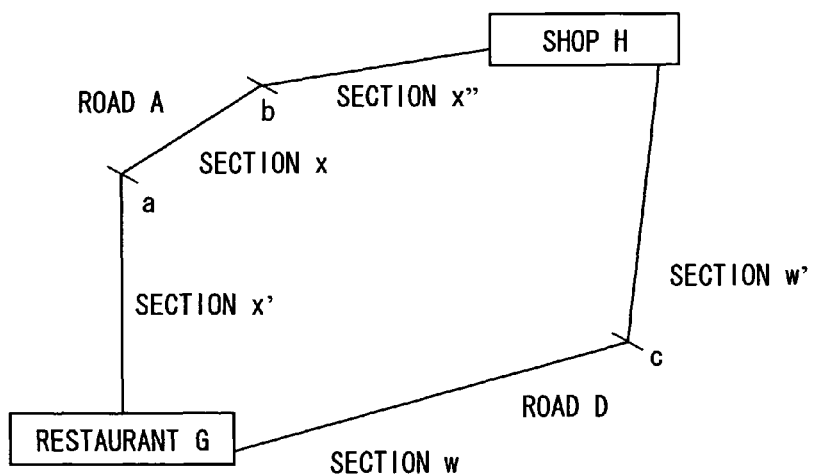
FIG. 8 illustrates an example of drowsiness detection information in the second embodiment of the present invention.
FIG. 9 illustrates a determination of a guidance route in the second embodiment of the present invention.
FIG. 10 illustrates a modification of determination of a guidance route with reference to the drowsiness detection information.

The contents of the database are, for example, as illustrated in FIG. 8. In this case, the point of start is restaurant G; the period of time during which the vehicle arrives at section x of a national road A and the period of time during which the vehicle arrives at section w of a national road D are respectively 13:00 to 14:00. It will be assumed that either of the following is determined as the guided route as illustrated in FIG. 9: a route candidate going from a restaurant G to a shop H by way of points a and b on the national road A; and a route candidate going from the restaurant G to the shop H by way of a point c on the national road D. In this case, the frequency (0.40) of a section w of the national road D is lower than the frequency (0.60) of a section x on the national road A. Therefore, the route candidate going to the shop H by way of the point c on the national road D is determined as the guided route.

With the above-mentioned configuration, a route by which the total of frequencies with which the driver's drowsiness was detected in the sections included in the route candidate from a departure place to a destination is minimized is searched for. Therefore, such a route that a section where the driver's drowsiness was detected in the past is avoided can be retrieved.

(Other Embodiments)

In the description of the above embodiments, cases where an acceleration sensor, a steering angle sensor, and an image recognition device are used to detect drowsiness of a driver have been taken as examples. However, the invention is not limited to those examples. Drowsiness of a driver may be detected by detecting, for example, an action intentionally taken by an occupant of the vehicle to stay awake. Examples of such actions include: an operation to lower the preset temperature of an air conditioner, an operation to open a window, and an operation to turn up the volume of audio equipment. Or, the following measure may be taken: an amount-of-take-up detector is provided for detecting the amount of take-up (i.e., the length of a rolled-up portion) of the driver's seat belt, and the driver's drowsiness is detected by detecting change in the amount of take-up of the driver's seat belt with the amount-of-take-up detector.

In the description of the first and second embodiments, it is determined at Step S216 whether or not there is any matching entry with respect to all of the following items in the database: a section of passage extracted from the route candidate, the period of time during which the vehicle passes through the section of passage, and the point of start. When it is determined that there is a matching group with respect to all of the items in the database, the evaluation value of the matching section is changed to the maximum value and a route from the departure place to the destination is searched for again. Instead, the evaluation value of the matching section may be further increased before a route from the departure place to the destination is searched for again.

In the description of the first and second embodiments, cases where the following measure is taken have been taken as examples: when it is determined at Step S216 or S316 whether or not there is any matching entry with respect to all of the following items in the database: a section of passage extracted from the route candidate, the period of time during which the vehicle passes through the section of passage, and the point of start; when it is determined that there is a matching entry with respect to all the times in the database, the evaluation value of the matching section is changed to the maximum value or the frequency of the matching section is extracted; and the section is stored in correlation with the route candidate. However, there need not be a matching entry with respect to all the items in the database. For example, the following measure may be taken: it is determined whether or not there is any entry in which a section of passage is matching with the section of passage extracted from the route candidate in the database; when it is determined that there is a matching entry with respect to the section of passage in the database, the evaluation value of the matching section is changed to the maximum value or the frequency of the matching section is extracted; and the section is stored in correlation with the route candidate. Alternately, the following measure may be taken: it is determined whether or not any matching entry with respect to the section of passage extracted from the route candidate and the period of time during which the vehicle passes through the section of passage in the database; and when it is determined that there is a matching entry with respect to the section of passage extracted from the route candidate and the period of time during which the vehicle passes through the section of passage in the database, the following measure is taken: the evaluation value of the matching section is changed to the maximum value or the frequency of the matching section is extracted and the section is stored in correlation with the route candidate.

In the description of the second embodiment, the following case has been taken as an example: a case where the frequency (0.60) in the data on the uppermost row in FIG. 8 and the frequency (0.40) in the data on the lowermost row are compared with each other to determine a guided route. However, if multiple sections where drowsiness of the driver was detected is included in a route candidate, for example, when a section corresponding to the data on the uppermost row in FIG. 10 and a section corresponding to the data on the third row is included in a route candidate, the following measure may be taken: the total sum (0.80) of the frequency (0.60) in the data on the uppermost row and the frequency (0.20) in the data on the third row is computed; and a route candidate in which the total sum of the frequencies of the sections included in the route candidate is minimized is determined as the guided route. When multiple sections where drowsiness of the driver was detected are included, some other computation expression may be used in place of the total sum of the frequencies of the sections included in a route candidate.

The above embodiments are not so constructed that, when drowsiness of the driver is detected, drowsiness detection information is not stored in the database in association with respective drivers. Therefore, there is a possibility that the route search will be carried out so as to avoid a section where drowsiness of a different driver was detected. To cope with the situation, the following measure may be taken: when driving is started, user identification is carried out; drowsiness detection information is discriminated on a user-by-user basis and stored in the database; and thus a route by which a section where his/her own drowsiness was detected is searched for by the driver him/herself in the route search. User identification can be carried out by various authentication methods, including fingerprint authentication, voice authentication, input of authentication code or the like.

In the description of the above embodiments, cases where the following measure is taken have been taken as examples: when the driver's drowsiness is detected, the section where the driver's drowsiness was detected, the period of time during which the driver's drowsiness was detected, and the place of start are stored in the database. In addition, some action may be provided to warn the driver that the driver's drowsiness has been detected.

In the description of the above embodiments, cases where route guidance processing in which route guidance is carried out in accordance with a guided route retrieved by the above route search processing have been taken as examples. However, when a section where drowsiness was detected by the driver is included in a guided route, the following measure may be taken: it may be informed that the vehicle will arrive at a drowsiness-detected section prior to passing the drowsiness-detected section.

In the description of the above embodiments, cases where the following measure is taken when a section where the driver's drowsiness was detected is included in a retrieved route have been taken as examples, in which a message indicating that a section where the driver's drowsiness was detected in the retrieved route is displayed. However, such a display need not be an only example. That is, information indicating that a section where the driver's drowsiness was detected is included in a retrieved route may be displayed in, for example, the following manner: the display color of a section where the driver's drowsiness was detected and the display color of a section where the driver's drowsiness has not been detected are made different from each other.

Description will be given to the correspondence between the wording in the above embodiments and the wording in claiming language. The processing of Steps S200 and S218 is equivalent to a first route search unit; the drowsiness detector 17 is equivalent to a drowsiness detecting unit; the database is equivalent to a storage unit; the processing of Steps S100 to S114 is equivalent to a storage control unit; the processing of Step S208 is equivalent to a first determination unit; the processing of S212 is equivalent to period of time computing unit; the processing of S216 and S316 is equivalent to a second determination unit; the processing of S200, S318, and S322 is equivalent to a second route search unit; and the display device 19 is equivalent to a displaying unit.

What is claimed is:

1. A route search apparatus equipped with a route search unit that computes an evaluation value of each section of a route from a departure place to a destination and retrieves a route by which a total evaluation value is minimized from among route candidates that provide a route from a departure place to a destination, the route search apparatus comprising:
   a drowsiness detector that detects the drowsiness of a driver of a vehicle; and
   a control device that facilitates
      storing in a storage unit a driving section where the drowsiness of the driver was detected by the drowsiness detector with a time of day in which the drowsiness was detected;
      referring to the storage unit and determining whether or not the driving section where the drowsiness of the driver was previously detected is included in a route candidate,
      computing a period of time in which the vehicle passes the driving section where the drowsiness of the driver was previously detected, the period of time being determined when it is determined that the driving section where the drowsiness of the driver was detected is included in a route candidate, and
      referencing the storage unit to determine whether the period of time that the vehicle passes the driving section matches the time of day in which drowsiness was previously detected for the driving section,
      when it is determined that the route candidate includes the driving section where the drowsiness of the driver was previously detected increasing the evaluation value of the driving section where the drowsiness of the driver was detected, and searching for an alternate route from the departure place to the destination, and
      determining that the period of time matches the time of day that the drowsiness of the driver was previously detected for the driving section, increasing the evaluation value of the driving section where the drowsiness of the driver was detected and searching for an alternate route from the departure place to the destination.

2. The route search apparatus of claim 1, wherein, when a section where the drowsiness of the driver was detected is included in a retrieved route, the control device causes a displaying unit to display information indicating that a section where the drowsiness of the driver was detected is included in the retrieved route.

3. A route search apparatus equipped with a route search unit that computes the evaluation value of each section of a route from a departure place to a destination, and retrieves a route by which the total evaluation value is minimized from among route candidates that provides a route from a departure place to a destination, the route search apparatus comprising:
   a drowsiness detector that detects drowsiness of a driver; and
   a control device that
      stores in a storage unit a driving section where the drowsiness of the driver was detected by the drowsiness detector and a probability ratio that provides a number of times drowsiness of the driver was detected in the driving section and the number of times the driving section has been driven,
      references the storage unit to determine whether or not a driving section where the drowsiness of the driver was previously detected is included in a route candidate, and
      when it is determined that the route candidate includes the driving section where the drowsiness of the driver was previously detected extracts the probability ratio of each driving section where the drowsiness of the driver was previously detected and is included in the route candidate, and searches for an alternate route, from among all route candidates, by which the total of the probability ratio of the driving sections where the drowsiness of the driver was detected is minimized.

4. The route search apparatus of claim 3, wherein the control device
   stores a period of time during which the drowsiness of the driver was detected together with the section where the drowsiness of the driver was detected in the storage unit,
   computes a period of time during which the section where the drowsiness of the driver was detected in the route candidate is passed through when it is determined by the first determination unit that a section where the drowsiness of the driver was detected is included in a route candidate from the departure place to the destination,
   refers to the storage unit and determines whether or not a period of time during which a section where the drowsiness of the driver was detected in the route candidate is passed through and a period of time during which a section where the drowsiness of the driver was detected was passed through match with each other, and
   when it is determined that a section where the drowsiness of the driver was detected is included in a route candidate from the departure place to the destination and it is determined that the period of time during which a section where the drowsiness of the driver was detected in the route candidate is passed through and the period of time during which a section where the drowsiness of the driver was detected was passed through match with each other, extracts the frequency of each section included in the route candidate with which the drowsiness of the driver was detected and searches for a route by which the total of the frequencies of the sections with which the drowsiness of the driver was detected is minimized from among route candidates from the departure place to the destination.

5. The route search apparatus of claim 4, wherein the control device stores a section where the drowsiness of the driver was detected, a period of time during which the drowsiness of the driver was detected, and the point of start of driving during which the drowsiness of the driver was detected in the storage unit, refers to the storage unit to determine whether or not the point of start in the route candidate and a present position match with each other and refers to the storage unit to determine whether or not a period of time during which a section where the drowsiness of the driver was detected in the route candidate is passed through and a period of time during which a section where the drowsiness of the driver was detected was passed through match with each other, and when it is determined that the point of start in the route candidate and the present position match with each other and the period of time during which the section where the drowsiness of the driver was detected in the route candidate is passed through and the period of time during which the section where the drowsiness of the driver was detected was passed through match with each other, extracts the frequency of each section included in the route candidate with which the drowsiness of the driver was detected and searches for a route by which the total of the frequencies of the sections with which the drowsiness of the driver was detected is minimized from among route candidates from the departure place to the destination.

6. The route search apparatus of claim 3, wherein, when a section where the drowsiness of the driver was detected is included in a retrieved route, the control device causes a displaying unit to display information indicating that a section where the drowsiness of the driver was detected is included in the retrieved route.

7. A route search apparatus equipped with a route search unit that computes an evaluation value of each section of a route from a departure place to a destination, and retrieves a route by which a total evaluation value is minimized from among route candidates that provide a route from the departure place to the destination, the route search apparatus comprising:

a drowsiness detector that detects drowsiness of a driver of a vehicle; and a control device that:

stores in a storage unit a driving section where the drowsiness of the driver was detected by the drowsiness unit with a starting point;

references the storage unit to determine whether or not a driving section where the drowsiness of the driver was previously detected is included in a route candidate;

references the storage unit to determine whether or not a departure place of driving during which the drowsiness of the driver was previously detected, as stored in the storage unit, matches the current departure place;

determines that the route candidate includes a driving section where the drowsiness of the driver was previously detected, the first route search unit increases the evaluation value of the driving section where the drowsiness of the driver was detected, and searches for an alternate route from the departure place to the destination; and determines that the departure place of driving during which the drowsiness of the driver was previously detected matches the current departure place, the route search unit increases the evaluation value of the section where the drowsiness of the driver was detected and searches for an alternate route from the departure place to the destination.

* * * * *